United States Patent
West et al.

(10) Patent No.: US 7,850,816 B2
(45) Date of Patent: Dec. 14, 2010

(54) ASSEMBLY OF SEALED COMPONENTS

(75) Inventors: Colin J West, Bristol (GB); Michael A Taylor, Bristol (GB)

(73) Assignee: Airbus Operations Limited, Bristol (GB)

( * ) Notice: Subject to any disclaimer, the term of this patent is extended or adjusted under 35 U.S.C. 154(b) by 400 days.

(21) Appl. No.: 10/535,493

(22) PCT Filed: Nov. 25, 2003

(86) PCT No.: PCT/GB03/05137

§ 371 (c)(1),
(2), (4) Date: May 18, 2005

(87) PCT Pub. No.: WO2004/051096

PCT Pub. Date: Jun. 17, 2004

(65) Prior Publication Data

US 2006/0000075 A1   Jan. 5, 2006

(30) Foreign Application Priority Data

Dec. 3, 2002   (GB) .................................. 0228109.5

(51) Int. Cl.
    C09J 5/00   (2006.01)
(52) U.S. Cl. .................. 156/308.2; 156/307.5; 156/327
(58) Field of Classification Search ............. 156/206.3, 156/307.5, 308.2, 324.4, 327; 244/135 R, 244/135 A, 135 B, 135 C
See application file for complete search history.

(56) References Cited

U.S. PATENT DOCUMENTS

| 3,022,870 | A | * | 2/1962 | John et al. ................... 403/267 |
| 3,659,896 | A | * | 5/1972 | Smith et al. .................... 296/93 |
| 3,904,038 | A | * | 9/1975 | Lester ......................... 206/447 |
| 4,106,184 | A | * | 8/1978 | Fournier et al. ............. 29/25.03 |
| 4,697,970 | A | * | 10/1987 | Hanson ........................ 211/24 |
| 5,484,221 | A | | 1/1996 | DeCoux |

FOREIGN PATENT DOCUMENTS

| DE | 32 43 436 A1 | 5/1984 |
| EP | 1 065 390 A2 | 7/2000 |
| EP | 1 081 043 A1 | 3/2001 |
| FR | 2498671 A * | 7/1982 |
| JP | 03292796 A * | 12/1991 |
| JP | 11072999 A * | 3/1999 |
| WO | 91/18733 | 12/1991 |

OTHER PUBLICATIONS

Abstract for FR 2498671.*
Abstract for JP 11072999.*
Abstract for JP 03292796.*
"Handbook of Adhesive Technology", pp. 319-327 1996 Akmal et al.*

* cited by examiner

Primary Examiner—John L Goff
(74) Attorney, Agent, or Firm—Nixon & Vanderhye P.C.

(57) ABSTRACT

A method of assembling components together in sealed relationship and an assembly of two components for forming a fluid-tight seal together are provided. The method includes applying to at least one mating surface a layer of polysulphide sealant and allowing it to cure before bringing together the mating surfaces under a moderate pre-determined pressure for a pre-determined length of time whereby to bring about a sealed joint between the two mating surfaces.

21 Claims, 2 Drawing Sheets

ASSEMBLY OF SEALED COMPONENTS

This application is the US national phase of international application PCT/GB2003/005137 filed 25 Nov. 2003, which designated the U.S. and claims priority of GB 0228109.5, dated 3 Dec. 2002, the entire contents of each of which are hereby incorporated by reference.

This invention relates to the assembly of sealed components and in particular, although not exclusively, to the assembly together of aircraft structural components used for the storage of fuel as part of the aircraft fuel system or manufacture gas tight joints to maintain a breathable atmosphere and which in any event are used to house fluids and gases on board the aircraft. A secondary action of these materials is to prevent the ingress of corrosive liquids such as salt water and reduce fretting on faying surfaces.

It is well known to seal together components in an aircraft which make up parts of the fuel storage system or part of a fluid tight structure such as the fuselage. In aircraft the central structural wing box of the aircraft wing, for example, is fabricated from upper and lower wing skins and front and rear wing spars which are joined together to form a central structural wing box. The metallic components for the wing box tend to be made of high strength aluminium alloys and a well known method of sealing the joints between adjacent structural members is to apply curable liquid polymers to a mating surface of one of the components by brush or roller, and then to bring the components together while the polymer is still soft to form a fluid tight seal along the mating surfaces of the joined components.

Well known sealant compounds contain polysulphide in a liquid polymer base. The sulphur atoms contained in these molecules assist in the formation of links to neighbouring elements present in the adjacent hydrocarbons such as carbon, oxygen, nitrogen and other sulphur atoms which efficiently form a seal to prevent egress of fuel. It is equally well known that the requirement to use a liquid polymer as a sealant carries numerous difficulties. Firstly, in order to ensure good adhesion between the liquid sealant and the primer-coated surface of the components to be sealed together it is often necessary to carefully wash each mating surface with an organic solvent and to rub down the primer paint prior to application of sealant.

Secondly, the handling of liquid sealants on the shop floor is notoriously labour intensive and liable to wastage. It is necessary for batches of liquid sealant polymer to be prepared just prior to usage in the right quantity and for skilled operators to apply a layer of the sealant to one of the mating surfaces to the correct thickness to ensure complete sealing but to avoid excess sealant being applied which would tend to be squeezed out of the joint on both sides and, where possible, would need later removal.

The preparation of too much sealant will inevitably lead to waste, and the sealant must be used shortly after it is prepared.

Thirdly, even though the effect is vastly reduced over bare substraight contact the use of liquid sealant can still lead to fretting and corrosion problems, for example round bolt holes. This can occur when a bolt is tightened to the extent that metal-to-metal contact occurs adjacent to the hole due to the squeezing out of the liquid polymer leaving diminished fluid resistance in that area. The resultant relative movement between the mating surfaces in the contact area can lead to corrosion occurring where protective coatings have been rubbed off.

It is an object of the invention to reduce or eliminate at least some of the difficulties associated with the prior art.

According to one aspect of the present invention there is provided a method of assembling components together in sealed relationship, the components have respective mating surfaces, the method including the steps of applying to a mating surface a layer of polysulphide sealant and allowing the sealant to cure; bringing together the mating surfaces and applying a pre-determined pressure therebetween for a pre-determined period whereby to bring about a sealed joint between the two mating surfaces.

It has been found that the cross-linking properties of sulphur containing molecules and polymers are capable of working across surface boundaries when two solid layers of cured polysulphide sealant are brought together. It has even been found that such cross-linking will occur between the polysulphide sealant applied to one of the mating surfaces when it is brought into contact with the other mating surface.

In order to achieve the cross-linking a moderate pressure needs to be applied between the two mating surfaces for a predetermined length of time. Standard testing procedures are used to try different pressures and different lengths of time upon samples, with subsequent testing of the samples revealing the most beneficial combination of time and pressure to be used in a given set of circumstances.

As indicated above a layer of polysulphide sealant may be applied to both mating surfaces or may be applied to only one mating surface.

The period of application of pressure between the mating surfaces may be at least 1 hour, preferably between 5 hours and $1 \times 10^7$ hours and more preferably between 8 and 1440 hours.

The pre-determined pressure may be between 5 MPa and 400 MPa, preferably between 5 MPa and 200 MPa and more preferably between 5 MPa and 50 MPa.

The pre-determined pressure is desirably applied by bolting together the two components in their final assembled configuration.

It is believed that the accuracy of jigging achieved by bolting the two components together during the occurrence of cross-linking of the sulphur atoms to other atoms within the polymer or other molecules is equally as good as any other jigging method and, once the best process parameters for the method have been established, the mating components will not need to be separated again.

In order to speed the cross-linking the components may be subject to a raised temperature during at least part of the step of applying pressure. This may be useful in circumstances where, for whatever reason, a reduction in process time is desirable.

The at least one layer of polysulphide sealant may be applied to a painted said mating surface, for example primer-coated.

The layer of polysulphide sealant may be applied to the painted mating surface a sufficiently short time after the paint is applied to at least substantially reduce the need for any further treatment of the painted surface prior to the application of the layer of polysulphide sealant.

More preferably, the layer of polysulphide sealant is applied to the painted surface immediately after the paint has dried, for example when primer-coated components leave the paint booth.

The components with sealant applied and cured may be stored and a protective covering may be applied to the cured layer of sealant prior to storage, for protection purposes.

In cases where the layer of polysulphide sealant is applied to only one mating surface, the mating surface to which the layer of sealant is not applied may be a painted surface, and may once again be a primer-coated surface, for example coating a metallic component such as an aluminium alloy wing skin or spar or other aircraft structural component.

The layer of polysulphide sealant applied may be cured by a metallic accelerated mechanism, specifically an oxidative mechanism employing a transition metal oxide. This oxide may be, for example, manganese dioxide or chromium in the form of a dichromate compound. Alternatively the layer of polysulphide sealant applied may be cured by an organic chemical reaction, for example epoxidation or condensation esterification.

The components to be assembled together may comprise aircraft structural components, for example those used in fuel tank manufacture or manufacture gas tight joints to maintain a breathable atmosphere and which in any event are used to house fluids and gases on board the aircraft.

According to second aspect of the invention there is provided an assembly of two components for forming a fluid or gas tight seal together, each component having a mating surface for sealing to a mating surface of the other component, at least one said mating surface having a layer of cured polysulphide sealant thereon.

The components may desirably form part of a fuel storage system, for example for an aircraft or other vehicle or alternatively in a stationary environment.

The invention will now be described, by way of example only with reference to the accompanying drawings of which:—

Figure 3:
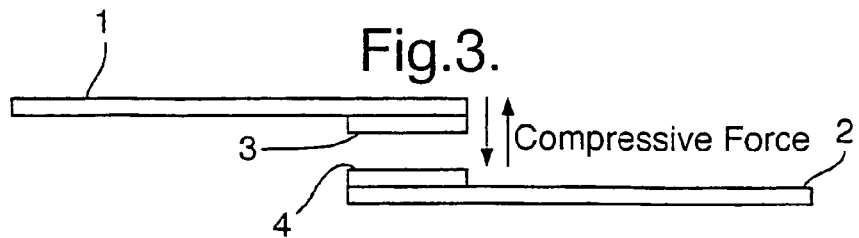
FIG. 3 is a side schematic view of a pair of lapshear samples, separated.
Figure 4:
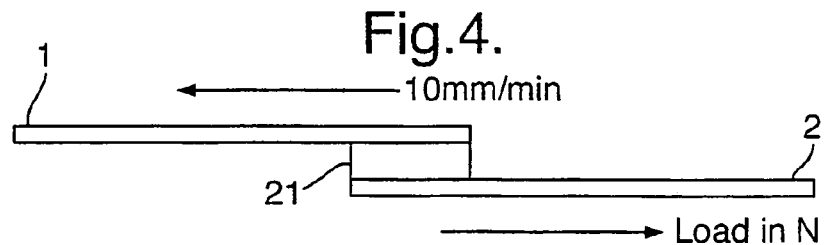
FIG. 4 shows the samples of FIG. 3 compressed together.

Referring to the drawings, a test method was devised to test the adhesion of one layer of cured polysulphide to another. In FIGS. 3 and 4 two standard lapshear samples 1, 2 of primer-painted 150 mm×25 mm aluminium were chosen which would allow comparison with previous lapshear results. A clamping force to compress the two samples together of 16 MPa was chosen.

The standard sealant thickness of a lapshear is 0.25 mm; therefore a skim 3, 4 of 0.125 mm thickness was applied to each specimen 1, 2 to give a value to be compared with previous results.

Figure 1:
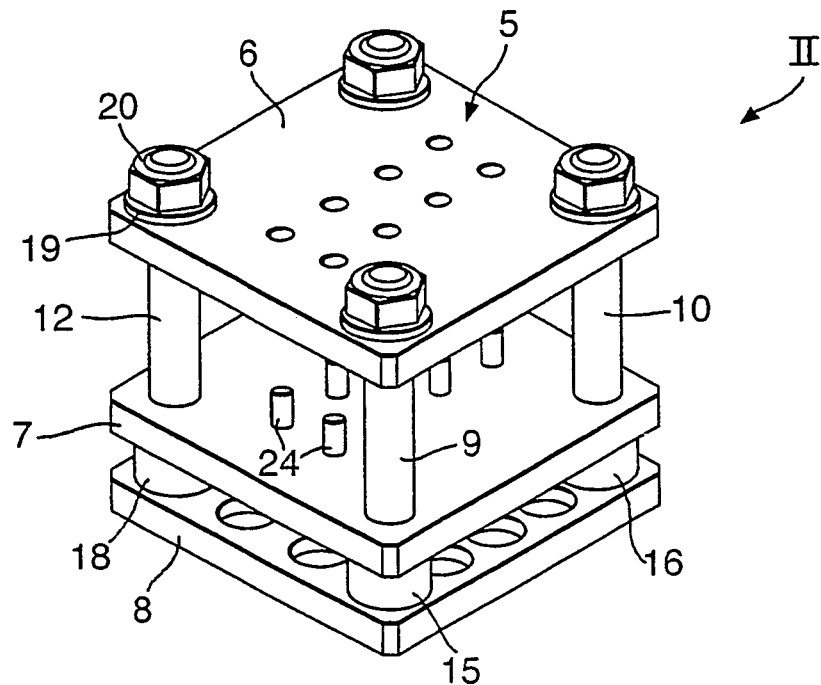
FIG. 1 is a perspective view of a compression jig.
Figure 2:
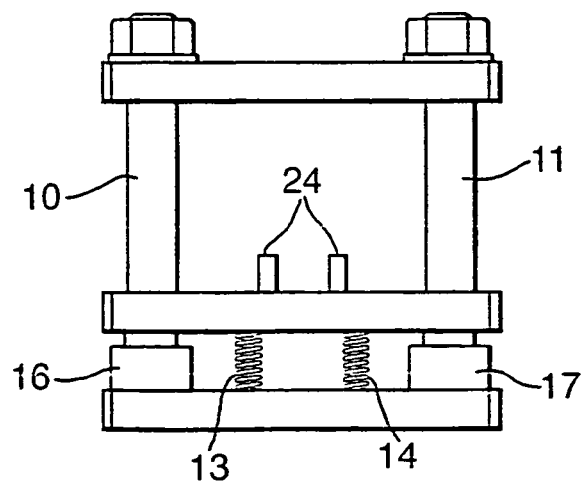
FIG. 2 is a view in the direction of arrow II of the jig of FIG. 1.

A jig 5 was designed and manufactured, see FIGS. 1 and 2, to simulate the required compressive load. The jig uses three plates 6, 7, 8 and four threaded posts 9, 10, 11, 12 to hold and compress the specimens. The bottom plate 8 is machined to accept a spring pack 13, 14, see FIG. 2, used to generate the compressive load. Fourteen springs comprise the spring pack. One spacer 15, 16, 17, 18 is fitted to each of the four posts. A correspondingly machined platen 7 is then fitted above the spring pack. The samples 1, 2 are installed onto this platen 7 between the two rows of locating pegs 24 and the top platen 6 placed above the samples. The compressive load is then simply applied by fitting a washer and nut to each of the four posts 9 to 12 and tightening until the four spacers 15 to 18 in the spring pack area just begin to bind. The springs 13, 14 exert the constant compressive load and occasionally (usually weekly) the nuts 20 require slight adjustment to ensure the spacers 15 to 18 are kept at the correct loads.

(The following process is described but not illustrated). For the initial examination PR-1770C-12 a well-known interfay grade of sealant was chosen. The aluminium specimens were abraded with a red Fibril pad and washed in MEK and then 8-000 solvent and dried with lint free paper wipes. The specimens were then painted with P205 primer to a thickness of 25-30 microns with primer batch number AK 5450 UR and activator 205 AK 5732 UR. These were then cured in an oven for three hours at sixty degrees centigrade. After one hour's cooling the specimens were coated with freshly mixed PR 1770 C12 sealant using a draw bar and tape shimming to give a coating thickness of 0.125 mm. Tape was used to give clean start lines to the coated area and to ensure the correct 25 mm×25 mm contact patch. A hardness button was prepared from the remaining material; this and the specimens were placed in a conditioning cabinet at 23° C. and 50% relative humidity for 14 days to fully cure.

The specimens were removed and assembled sealant face to sealant face as shown in FIGS. 3 and 4.

The specimens were stacked to height of nine pairs in the constant compression jig 5 and the jig clamped together. The specimens were left assembled for 63 days at ambient temperature indoors (21° C.+/−3° C.). Once the test period was completed five specimen pairs 1, 2 were removed from the compression jig 5 and immediately fitted to a tensometer (not shown) with a 10KN load cell and a crosshead speed of 10 mm/min.

The last four specimen pairs 1, 2 were allowed to stand for four hours and then fitted to the tensometer.

Results

| Set one immediate test | | | | |
|---|---|---|---|---|
| Sample 1 | width 22.5 | max load 770N | 1.37 MPa | 98% AF/2%CF* |
| Sample 2 | width 23.8 | max load 581N | 0.98 MPa | 98% AF/2%CF* |
| Sample 3 | width 24.1 | max load 2179N | 3.60 MPa | 95%% CF/5%AF |
| Sample 4 | width 22.3 | max load 2337N | 3.70 MPa | 95%% CF/5%AF |
| Sample 5 | width 24.6 | max load 2076N | 3.38 MPa | 95%% CF/5%AF |
| Set two test after four hours | | | | |
| Sample 1 | width 24.6 | max load 2118N | 3.44 MPa | 95%% CF/5%AF |
| Sample 2 | width 24.9 | max load 1873N | 3.01 MPa | 95%% CF/5%AF |
| Sample 3 | width 23.9 | max load 2189N | 3.66 MPa | 95%% CF/5%AF |
| Sample 4 | width 24.2 | max load 3077N | 5.09 MPa | 95%% CF/5%AF |

All dimensions in mm lengths are set at 25.

Figure 5:
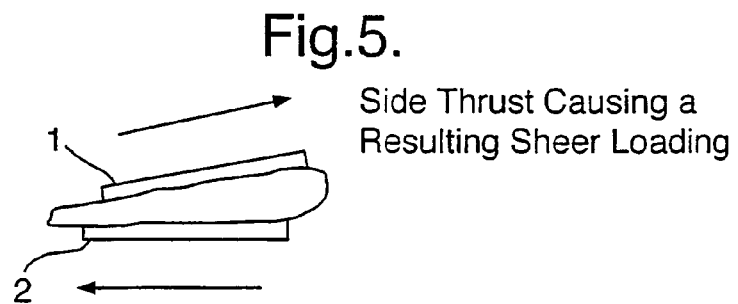
FIG. 5 shows two samples which have experienced a sideways thrust.
Figure 6:
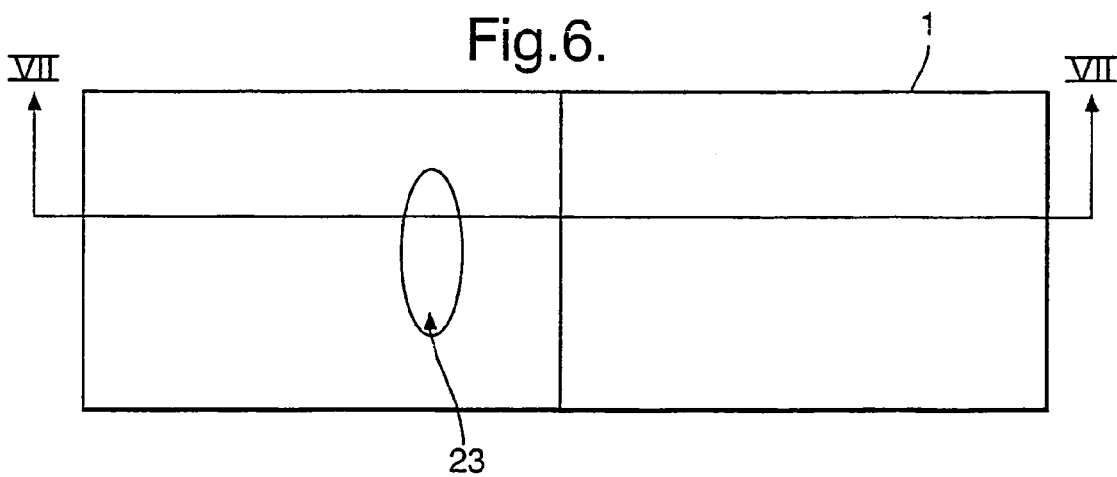
FIG. 6 is a top plan view of a sample which has undergone the lapshear test.

The first two results from set one can be disregarded as examination of the samples showed that sideways thrust on the specimens had rolled the sealant away from the primer, see FIG. 5.

The thrust was caused by the top platen 6 rocking over to one side as the jig 5 was tightened, sealant 3, 4 visibly exuded from one side of these two specimens within two days of the tightening procedure. The sideways thrust was taken up by the uppermost 1 of the two samples. The others were not subjected to this unwanted shearing load and behaved accordingly.

The loads required to pull the lapshear specimens 1, 2 apart were high, averaging 3.70 MPa. This figure is slightly higher than the figure expected for a standard wet assembly polysulphide joint. Some adhesive failure was noted on all the test specimens. This is normally regarded as a failure, but in this case, to achieve adhesive failure was an indication of the very high loads required to separate the bond formed in the layers 3, 4 of sealant previously pressed together. The expectation was that the sealant would pull apart along the jointing interface 21 with low or moderate load.

Figure 7:
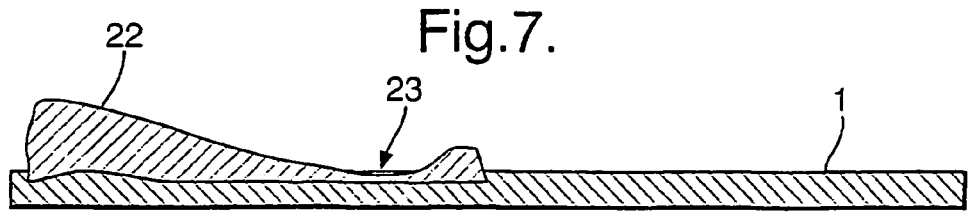
FIG. 7 is a section taken on the line VII-VII of FIG. 6.

The failure mode was of a wedge shape 22, see FIG. 7, through the sealant layer going to the primer coat in the way of a well-controlled peel test.

Conclusion

1. This experiment proved that cured polysulphide sealant films do bond to other polysulphide films when subjected to moderate compressive loads.
2. The bonding is of a high strength leaving no remnant of the bond line in the contact patch.
3. Bonding is adequate at ambient temperature in a normal working environment.
4. Bonding is achieved within a realistic interval.

In addition, and separately, periods of 1 day, 3 days, 7 days, 14 days and 48 days have been tried.

This property of cured polysulphide sealants means that the application of the wet sealant can be carried out remotely from the assembly work stations. The sealant is ideally applied as the component leaves the primer painting booth and much faster curing grades of resin can be used to reduce delay, in order to achieve this. The components can then be covered by a sealing film for storage if necessary and all taken directly to the assembly station for the components.

The benefits of this process are a reduction of jig assembly time; a reduction of waste sealant; cost reduction; reduction of the use of solvent, on the shop floor, and reduction of harmful chrome-containing dusts generated in rubbing down procedures. Additionally, the need for organic solvent washing and rubbing down of primer paint with abrasives prior to assembly are reduced.

It is envisaged that for improved production rates rapid cure sealant can be applied, either manually or by automation methods.

This process may in addition remove the need to apply fillet sealant on items such as aircraft wing stringers which will be an enormous reduction in workload.

The application of liquid sealant is one of the main barriers to aircraft wing assembly automation and the method of the invention is foreseen as a vital step towards full automated assembly.

Subsequent to the tests described above, and as two examples gave unexpectedly strong joints, it was decided to try the process with a single layer of sealant on the first component pressed against a painted substrate of the second component. It was found that the sealant stuck to the paint equally as well as to another layer of sealant. Thus it is foreseen that a single layer of sealant, applied to one mating surface only will bond to a second mating surface, following the bolting up of the joint. Additionally, it has been found that an adhesion promoter, normally used with wet sealants before application of the sealant, does not appear to be required. Thus a further process step will be saved by the use of the method of the invention.

A further advantage of the method of the invention is that a greater thickness of sealant remains between the mating surfaces when the substrates are bolted together. This leads to potential fatigue benefits, for example for use in aircraft structures and also potentially to improved fluid leak path performance. Both these benefits result from the fact that the sealant will not be squeezed out from the joint in the same way as liquid sealant. Thus metal to metal contact and hence fatigue problems and leak path problems are unlikely to result.

A yet further benefit of the invention is that improved load transfer between the components is likely to result with the possibility that mechanical fasteners distributed along the joint may be reduced in number.

By the term "polysulphide" is meant a polymer containing sulphur or sulphur-to-sulphur bonds which are incorporated into the polymer.

It is anticipated that the polysulphide sealant will bond equally well to rubber, glass, plastics, composites and metals.

The effective shelf life of the cured sealant appears to be indefinite.

A test was carried out to determine the fatigue properties of a joint according to the invention. Two lapshear samples as described above were prepared. The first sample had skims of 0.125 mm and the second had skims of 0.4 mm. No fretting was determined at the end of a standard fatigue test.

Further aspects of the invention for consideration are the resistance of the bond to chemical and thermal ageing and the effect of cold creep on the bond.

The invention claimed is:

1. A method of assembling components together in sealed relationship, the components have respective mating surfaces, the method including the steps of:
    applying to at least one mating surface a layer of polysulphide sealant and allowing the sealant to cure;
    after allowing said sealant to cure, bringing together the mating surfaces; and
    applying a pre-determined pressure therebetween for a pre-determined period whereby to bring about a sealed joint between the two mating surfaces.
2. A method as in claim 1 in which said layer of polysulphide sealant is applied to both mating surfaces.
3. A method as in claim 1 in which the period of application of pressure is at least 1 hour.
4. A method as in claim 3 in which the said period is between 5 and $1 \times 10^7$ hours.
5. A method as in claim 3 in which the said period is between 8 and 1440 hours.
6. A method as in claim 1 in which the pre-determined pressure is between 5 and 400 MPa.
7. A method as in claim 1 in which the pre-determined pressure is between 5 and 200 MPa.
8. A method as in claim 1 in which the pre-determined pressure is between 8 and 50 MPa.
9. A method as in claim 1 in which the pre-determined pressure is applied by bolting together the two components in their final assembled configuration.
10. A method as in claim 1 in which the components are subject to a raised temperature during at least part of the step of applying pressure.
11. A method as in claim 1 in which the at least one layer of polysulphide sealant is applied to a painted said mating surface.
12. A method as in claim 11 in which the layer of polysulphide sealant is applied to the painted mating surface a sufficiently short time after the paint is applied to at least substantially reduce the need for any further treatment of the painted surface prior to the application of the layer of polysulphide sealant.
13. A method as in claim 12 in which the layer of polysulphide sealant is applied to the painted surface immediately after the paint has dried.
14. A method as in any preceding claim in which the components with sealant applied are stored, including the step of applying a protective covering to the cured layer of polysulphide sealant prior to storage of the component.
15. A method as in claim 1, in which the mating surface to which the layer of polysulphide sealant is not applied is a painted surface.

16. A method as in claim 1 in which the layer of polysulphide sealant applied is a transition metal oxide curing compound.

17. A method as in claim 1 in which the layer of polysulphide sealant applied is a manganese dioxide curing compound.

18. A method as in claim 1 in which the layer of polysulphide sealant applied is a dichromate curing compound.

19. A method as in claim 1 in which the layer of polysulphide sealant applied is an organic-cure compound.

20. A method of assembling components together as in claim 1 in which the components comprise aircraft structural components.

21. A method as in claim 20 in which the aircraft structural components are used to house fuel on board the aircraft.

* * * * *